United States Patent
Zhang et al.

(10) Patent No.: US 11,382,161 B2
(45) Date of Patent: Jul. 5, 2022

(54) METHOD AND DEVICE TO PROVIDE ACCESS CONTROL FOR A USER EQUIPMENT TO MANAGE ACCESS BARRING TIMERS

(71) Applicants: SHARP KABUSHIKI KAISHA, Osaka (JP); FG Innovation Company Limited, Tuen Mun (HK)

(72) Inventors: Chongming Zhang, Shanghai (CN); Hidekazu Tsuboi, Osaka (JP); Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/042,739

(22) PCT Filed: Mar. 28, 2019

(86) PCT No.: PCT/CN2019/080131
§ 371 (c)(1),
(2) Date: Sep. 28, 2020

(87) PCT Pub. No.: WO2019/192387
PCT Pub. Date: Oct. 10, 2019

(65) Prior Publication Data
US 2021/0029769 A1    Jan. 28, 2021

(30) Foreign Application Priority Data
Apr. 2, 2018 (CN) .......................... 201810286335.2

(51) Int. Cl.
*H04W 76/18* (2018.01)
*H04W 76/19* (2018.01)
(Continued)

(52) U.S. Cl.
CPC ........... *H04W 76/18* (2018.02); *H04W 48/14* (2013.01); *H04W 76/19* (2018.02); *H04W 76/27* (2018.02); *H04W 76/30* (2018.02)

(58) Field of Classification Search
CPC ..... H04W 76/18; H04W 76/19; H04W 76/30; H04W 76/27; H04W 48/14; H04W 28/04;
(Continued)

(56) References Cited

U.S. PATENT DOCUMENTS

2013/0223205 A1* 8/2013 Chuang ................. H04W 48/04
370/225
2015/0223270 A1* 8/2015 Kim ..................... H04W 56/001
370/329
(Continued)

FOREIGN PATENT DOCUMENTS

CN    102892177    *    1/2013
CN    102892177 A       1/2013
(Continued)

OTHER PUBLICATIONS

3rd Generation Partnership Project, Technical Specification Group Radio Access Network, NR, Radio Resource Control (RRC) protocol specification, 3GPP TS 38.331 V15.4.0 (Dec. 2018).
(Continued)

*Primary Examiner* — Mewale A Ambaye
(74) *Attorney, Agent, or Firm* — ScienBiziP, P.C.

(57) ABSTRACT

An access control method and a user equipment are provided in the present invention. The access control method in a user equipment includes: determining, according to a status of the user equipment, a corresponding access control parameter to execute access control; if a result of the access control is access barring, then starting different access barring timers corresponding to different user equipment states, or starting the same access barring timer in the different user equipment (Continued)

states; and determining a duration of the started access barring timer according to the corresponding access control parameter.

12 Claims, 3 Drawing Sheets

(51) Int. Cl.
*H04W 76/30* (2018.01)
*H04W 76/27* (2018.01)
*H04W 48/14* (2009.01)

(58) Field of Classification Search
CPC . H04W 48/02; H04W 36/0033; H04W 76/10; H04W 8/005
See application file for complete search history.

(56) References Cited

U.S. PATENT DOCUMENTS

| | | | |
|---|---|---|---|
| 2019/0215756 A1* | 7/2019 | Park | H04W 52/06 |
| 2019/0246442 A1* | 8/2019 | Park | H04W 72/0453 |
| 2019/0253949 A1* | 8/2019 | Park | H04B 7/0695 |
| 2020/0336891 A1* | 10/2020 | Guo | H04W 68/005 |

FOREIGN PATENT DOCUMENTS

| | | |
|---|---|---|
| CN | 105580439 A | 5/2016 |
| CN | 109314913 A | 2/2019 |
| EP | 2219411 A1 | 8/2010 |

OTHER PUBLICATIONS

Intel Corporation, "Handling of barring timer T30x", R2-1809768, 3GPP TSG RAN WG2 Meeting NR Adhoc 1807, Montreal, Canada, Jul. 2-6, 2018.

Xiaomi Communications, "The timers in UAC", R2-1811757, 3GPP TSG-RAN2# 103, Gothenburg, Sweden, Aug. 20-24, 2018.

ZTE Corporation, Sanechips, "Consideration on the barring parameters", R2-1802031, 3GPP TSG-RAN WG2 NR Ad hoc 101, Athens, Greece, Feb. 26-Mar. 2, 2018.

Huawei, HiSilicon, "Access Control in NR for RRC_Connected", R2-1709551, 3GPP TSG-RAN WG2 #99, Berlin, Germany, Aug. 21-25, 2017.

LG Electronics Inc., "Access barring for CE level in feMTC", R2-1711160, 3GPP TSG-RAN WG2 Meeting #99-Bis, Prague, Czech Republic, Oct. 9-13, 2017.

Ericsson (e-mail discussion rapporteur), "Report of email discussion [AH1807#10][NR] Access Control (Ericsson)", R2-1811314, 3GPP TSG-RAN WG2 #103, Gothenburg, Sweden, Aug. 20-24, 2018.

* cited by examiner

METHOD AND DEVICE TO PROVIDE ACCESS CONTROL FOR A USER EQUIPMENT TO MANAGE ACCESS BARRING TIMERS

TECHNICAL FIELD

The present invention relates to the field of radio communication technologies, and in particular, the present invention relates to an access control method and a corresponding base station and user equipment.

BACKGROUND

With the rapid growth of mobile communications and the tremendous advancement of technologies, the world will move towards a completely interconnected network society, that is, anyone or anything can obtain information and share data anytime and anywhere. It is estimated that by 2020, the number of interconnected devices will reach 50 billion, of which only about 10 billion may be mobile phones and tablet computers. The others are not machines that interact with people, but machines that interact with each other. Therefore, how to design a system to better support the Internet of Everything is a subject that requires in-depth research.

For this reason, at the Third Generation Partnership Project (3GPP) Radio Access Network (RAN) #64 plenary meeting held in March 2016, a research topic of a new 5G radio access technology was proposed (see the non-patent reference: RP-160671 New SID Proposal: Study on New Radio Access Technology). In the description of the work item, the working frequency band of a new communication standard in the future can be expanded to 100 GHz, and at the same time it will at least meet the needs of enhanced mobile broadband services, the communication needs of massive Internet of Things terminals, and the service needs of high reliability requirements. The research work of the item will be completed in 2018.

In order to better perform access control, in a new generation radio technology New Radio (NR) system, it is necessary to implement access control for a user equipment (UE) in a connected state. However, an access control manner for a UE in an idle state is currently known, but no implementation manner of the access control for a UE in a connected state has been proposed. Therefore, how to implement the access control for the UE in the connected state is a problem that needs to be solved. For example, in the existing mechanism, for a UE in an idle state, when a new service arrives at a non-access stratum of the UE, a corresponding access category of the service and an access identity of the UE will be provided to an access stratum of the UE, and the access stratum performs the access control. Specifically, the UE performs processing based on the access category and an access control parameter configured by a network, thereby obtaining a result of the access control. If the result of the control is access barring, then an access barring timer is started, and when the timer expires, the non-access stratum is notified of alleviation of the corresponding barring.

In addition, if the access barring timer is started when the UE is in a connected state, then how to manage the access barring timer started in the connected state is a problem that needs to be solved. For example, in the existing mechanism, for a user in the idle state, the unit time of the access barring timer may be seconds, but for a user in the connected state, if the unit of seconds is also used, then the user may be caused to wait for an excessively long time, thus affecting the user experience.

For the UE in the connected state, if a Radio Link Failure (RLF) occurs and then a Radio Resource Control (RRC) connection re-establishment procedure is triggered, then how to deal with the access barring timer that is running.

In addition, when an RRC connection release message is received, the connection is released after a period of time. If an access barring timer is running at this time, then how to deal with the timer is also a problem that needs to be solved.

In addition, a network side may trigger the access barring timer as required, so as to reasonably configure the service traffic, and therefore, how the access barring timers are uniformly managed by the network side is also a problem that needs to be solved.

SUMMARY

An aspect of the present invention is to provide a method and a UE, the method being capable of appropriately executing access control according to a status of a UE.

Another aspect of the present invention is to provide a method and a UE, the method being capable of implementing access control for a UE in a connected state.

Another aspect of the present invention is to flexibly manage an access barring timer in an access control method for a UE and a UE, thereby improving the service processing efficiency and improving the user experience.

Still another aspect of the present invention is to provide an access control method for a UE in which access barring timers may be uniformly managed by a network side and a UE.

According to a first aspect of the present invention, an access control method in a UE is provided, comprising: determining, according to a status of the UE, a corresponding access control parameter to execute access control; if a result of the access control is access barring, then starting different access barring timers corresponding to different UE states, or starting the same access barring timer in the different UE states; and determining a duration of the started access barring timer according to the corresponding access control parameter.

In the above access control method, optionally, the status of the UE includes a connected state, an idle state, and an inactive state, and the duration of the access barring timer started in the connected state is shorter than the duration of the access barring timer started in the idle state or the inactive state.

In the above access control method, optionally, the determining, according to a status of the UE, a corresponding access control parameter to execute access control further includes: receiving indication information from a network side; and if the indication information includes an indication of performing access control in the connected state, then executing the access control based on the access control parameter used in the connected state.

In the above access control method, optionally, the access barring timer that is running is stopped in at least one of the following cases: a) it is determined that a radio link failure has occurred; b) RRC connection re-establishment is initialized; c) an RRC connection reconfiguration message is received, and the message includes at least information for instructing the UE to synchronize to a new target cell; and d) an RRC connection release message is received.

In the above access control method, optionally, if the access barring timer that is running is stopped when the RRC connection release message is received, then an operation related to connection release is executed after a preset duration.

In the above access control method, optionally, after the access barring timer that is running is stopped, the network side is notified of barring alleviation of an access category corresponding to the access barring timer.

According to a second aspect of the present invention, an access control method in a UE is provided, comprising: receiving indication information from a network side; if the indication information includes an indication of starting an access barring timer, then starting the access barring timer; and if the indication information includes an indication of stopping the access barring timer, then stopping the access barring timer that is running.

In the above access control method, optionally, the access barring timer is one or a plurality of access barring timers corresponding to one or a plurality of access categories, or a general access barring timer.

In the above access control method, optionally, if the indication information includes an indication of starting the access barring timer, then the access barring timer is started immediately, or the access barring timer is started at a predefined time; if the indication information includes an indication of stopping the access barring timer, then the access barring timer that is running is stopped immediately, or the access barring timer that is running is stopped at a predefined time.

According to a third aspect of the present invention, a UE is provided, comprising: a processor; and a memory storing instructions, wherein when run by the processor, the instructions execute the above access control method.

Effect of the Invention

According to the access control method and the UE of the present invention, the access control may be appropriately executed according to the status of the UE.

In addition, according to the access control method and the UE of the present invention, the access control for the UE in the connected state may be implemented.

In addition, according to the access control method and the UE of the present invention, the access barring timer may be flexibly managed in the access control method for the UE and the UE, thereby improving the service processing efficiency and improving the user experience.

In addition, according to the access control method and the UE of the present invention, the access barring timers may be uniformly managed by the network side, thereby configuring the service traffic reasonably.

BRIEF DESCRIPTION OF THE DRAWINGS

The above and other features of the present invention will become more apparent through the following detailed description with reference to the accompanying drawings, wherein.

DETAILED DESCRIPTION

The present invention will be described in detail below with reference to the accompanying drawings and specific implementation manners. It should be noted that the present invention should not be limited to the specific implementation manners described below. In addition, for the sake of brevity, detailed descriptions of well-known technologies that are not directly associated with the present invention are omitted to prevent confusion in the understanding of the present invention.

Before detailed description, terms mentioned in the present invention are illustrated first as follows. Unless otherwise specified, the terms involved in the present invention have the following meanings.
UE: User Equipment
RLF: Radio Link Failure
NR: New Radio
eLTE: Enhanced Long Term Evolution
PDU: Protocol Data Unit
NAS: Non-access stratum
AS: access stratum In the following, a plurality of implementation manners according to the present invention are described in detail by using an NR mobile communication system and subsequent evolved versions thereof as an example application environment, and using NR-supporting base stations and UE devices as examples. However, it should be pointed out that the present invention is not limited to the following implementation manners, but may be applied to more other radio communication systems, such as eLTE communication systems, and may also be applied to other base stations and UE devices, such as eLTE-supporting base stations and UE devices.

In order to perform access control, an upper layer of the UE (it may be referred to as a non-access stratum (NAS) here) provides information such as an access identity and an access category to a lower layer (it may be referred to as an access stratum (AS) here).

The AS of the UE executes an access barring check based on the information such as the access identity and the access category.

The access barring check has two results: one is barring, and the other is not barring/allowed.

The barring means that the UE may consider access to a current cell as barred/not allowed (consider access to the cell as barred); the barring may also mean that the UE considers establishment of a new PDU session in the current cell as not allowed/barred.

The allowed means that the UE considers access to the current cell as allowed (consider access to the cell as not barred); the allowed may also mean that the UE considers establishment of a new PDU session in the current cell as allowed.

When the result of the access barring check is barring, the UE may start an access barring timer and notify the upper layer of information about barring, which may be access barring or failure, or establishment of a PDU session being barred or failure. Preferably, this kind of barring or failure refers to the barring or failure of the access category provided by the NAS. When the access barring timer expires, the UE notifies the upper layer of barring alleviation of the access category.

When the result of the access barring check is allowed, the UE may continue the corresponding procedure, such as establishing a new PDU session.

Figure 1:
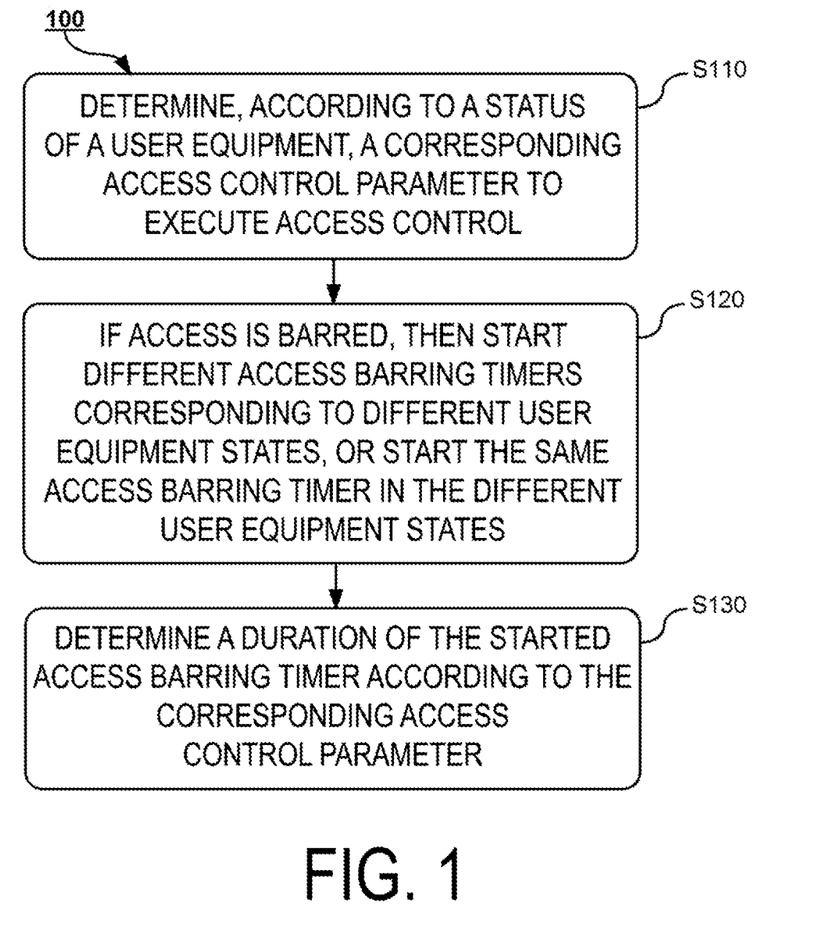
FIG. 1 is a flowchart of an access control method in a UE according to an embodiment of the present invention.

FIG. 1 is a flowchart of an access control method 100 in a UE according to an embodiment of the present invention. In the method, the UE starts an access barring timer based on a result of executing access control.

Specifically, as shown in FIG. 1, the method 100 includes step S110, step S120, and step S130.

In step S110, according to a status of the UE, a corresponding access control parameter is determined to execute access control.

In step S120, if a result of the access control is access barring, then different access barring timers corresponding to different UE states are started, or the same access barring timer is started in the different UE states.

In step S130, a duration of the started access barring timer is determined according to the corresponding access control parameter.

According to the above method 100, it is not limited to the UE in an idle state in the past, but takes into account various states that the UE may be in, and determines the corresponding access control parameter according to the status of the UE, thereby executing the access control according to the determined access control parameter. Therefore, the access control may be appropriately executed according to the status of the UE.

Moreover, according to the above method 100, if the result of the access control is access barring, then different access barring timers corresponding to different UE states may be started, or the same access barring timer may be started in the different UE states, and the duration of the started access barring timer is determined according to the corresponding access control parameter. Therefore, the access barring timer may also be flexibly managed, thereby improving the service processing efficiency and improving the user experience.

Figure 2:
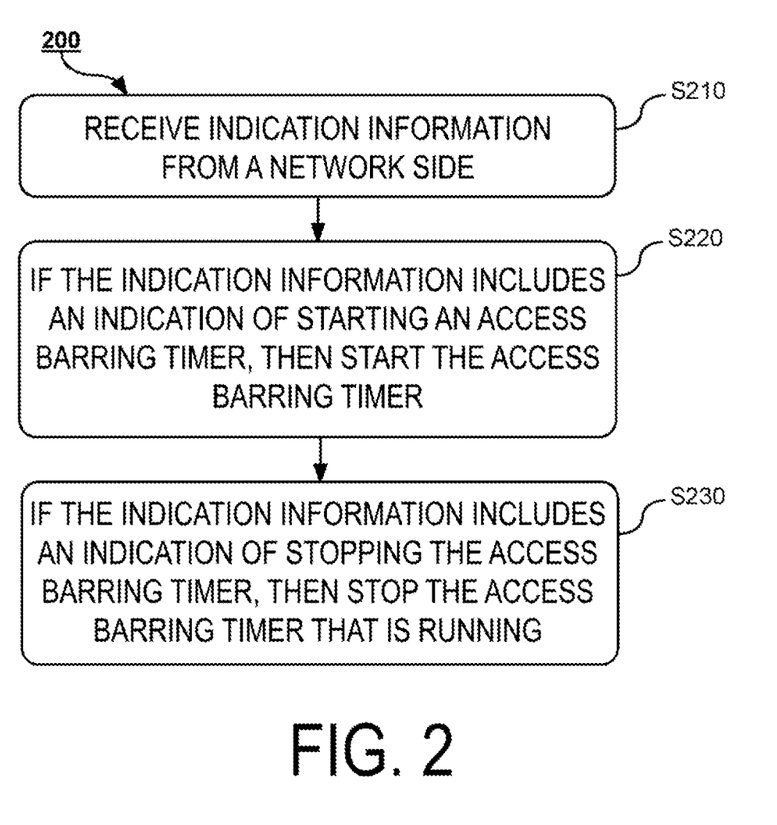
FIG. 2 is a flowchart of another access control method in a UE according to an embodiment of the present invention.

FIG. 2 is a flowchart of an access control method 200 in a UE according to an embodiment of the present invention. In the method, a network side instructs, through an indication message, to start or stop an access barring timer.

Specifically, as shown in FIG. 2, the method 200 includes step S210, step S220, and step S230.

In step S210, indication information from the network side is received.

In step S220, if the indication information includes an indication of starting an access barring timer, then the access barring timer is started.

In step S230, if the indication information includes an indication of stopping an access barring timer, then the access barring timer that is running is stopped.

According to the above method 200, the UE receives the indication information from the network side, and starts or stops the access barring timer according to the indication of starting or stopping the access barring timer included in the indication information; therefore, the access barring timers may be uniformly managed by the network side, so that the service traffic can be configured reasonably.

Embodiments of the present invention will be described in detail below.

Embodiment 1

When a UE receives an access category indicated by an upper layer and executes access control, a corresponding or relevant access control parameter may be determined based on a status of the UE, for executing the access control. For example:

when the UE is in a connected state, or a new PDU session is established in the connected state, the access control is executed based on an access control parameter used in the connected state;

when the UE is in an idle state, or when the UE in the idle state requests to establish a connection, or when the UE transitions from the idle state to the connected state, the access control is executed based on an access control parameter used in the idle state; and when the UE is in an inactive state, or when the UE transitions from the inactive state to the connected state, or when the UE in the inactive state requests to establish a connection, the access control is executed based on an access control parameter used in the inactive state.

Preferably, when the UE is in the inactive state, or when the UE transitions from the inactive state to the connected state, or when the UE in the inactive state requests to establish a connection, the access control may be executed based on the access control parameter in the idle state.

The access control parameter may include an access control factor, an average access barring timer duration, or the like. The network may set, for different UE states, an access control parameter with different values (the parameter is the same, but the values are different) or different access control parameters (the parameters are different, and the values may be the same or different). For example, the specific operation of the access control may include: determining a random number, comparing the random number with the magnitude of the access control factor, determining that a result of the access control is allowed when the random number is less than the access control factor, otherwise determining that the access result is barring, and based on an average value of the access barring timer, determining the duration of the access barring timer, starting the access barring timer, and the like.

When the UE executes the access control, the UE may be in the connected state, the idle state, or the inactive state, and the UE may also be in a state of transitioning from the idle state to the connected state or a state of transitioning from the inactive state to the connected state; or, the UE may be in a state of establishing a new PDU session in the connected state, a state of requesting connection establishment in the idle state, or a state of requesting connection establishment in the inactive state.

For an access category, if the result of the access control is barring, then different timers may be started according to the status of the UE executing the access control. For example, when a result of the UE performing access control for certain access is barring:

when the UE is in the connected state, or establishes a new PDU session in the connected state, T1 (a first timer) is started;

when the UE is in the idle state, or when the UE in the idle state requests to establish a connection, or when the UE transitions from the idle state to the connected state, T2 (a second timer) is started; and when the UE is in the inactive state, or when the UE transitions from the inactive state to the connected state, or when the UE in the inactive state requests to establish a connection, T3 (a third timer) is started.

Preferably, T2 and T3 may be the same timer, that is, it can be considered that the processing of the UE in the idle state is the same as that in the inactive state.

Preferably, a duration of T1 is shorter than durations of T2 and T3.

Another implementation method of starting different timers according to the status of the UE executing the access control may be:

when the UE performs the access control based on the access control parameter used in the connected state, starting T1;

when the UE performs the access control based on the access control parameter used in the idle state, starting T2; and when the UE performs the access control based on the access control parameter used in the inactive state, starting T3.

When the access barring timer is started, the duration of the timer also needs to be set. The duration of the access barring timer may be a type of access control parameter, and therefore, the duration of the timer may be determined according to the determined access control parameter.

For example, when a result of the UE performing the access control for certain access is barring, an access barring timer T4 is started:

when the UE is in the connected state, a duration of T4 is set based on the access control parameter in the connected state;

when the UE is in the idle state, the duration of T4 is set based on the access control parameter in the idle state;

when the UE is in the inactive state, the duration of T4 is set based on the access control parameter in the inactive state; and preferably, when the UE is in the inactive state, the duration of T4 may also be set based on the access control parameter in the idle state.

Preferably, the duration of T4 set when the UE is in the connected state is shorter than the duration of T4 set when the UE is in the idle state or the inactive state. For example, if the duration of T4 set when the UE is in the idle state or the inactive state is in the unit of seconds, then the duration of T4 set when the UE is in the connected state may be in the unit of milliseconds or slots or subframes.

The access control parameter is determined based on the status of the UE, and therefore, the above procedure may also be described as determining the duration of the access barring timer based on the status of the UE.

Embodiment 2

A UE may determine, based on an indication from a network side, whether access control in a connected state needs to be performed.

When indication information received by the UE carries information to indicate performing access control in the connected state, the UE executes the access control based on an access control parameter (for example, an access control factor, a value of an access barring timer, etc.) used in the connected state. The indication information may be included in system information or dedicated signaling. For example, the access control may include: determining a random number, comparing the random number with the magnitude of the access control factor, determining that a result of the access control is allowed when the random number is less than the access control factor, otherwise determining that the access result is barring, and based on the value of the access barring timer, determining a duration of the access barring timer, starting the access barring timer, and the like.

Preferably, when the system information or dedicated signaling received by the UE carries information to indicate performing the access control in the connected state, this indication may be an explicit indication or an implicit indication.

The explicit indication may be a 1-bit indication bit indicating whether access control in the connected state is required. For example, the bit set to 0 or TRUE indicates that access control needs to be performed; and the bit set to 1/FALSE indicates that access control does not need to be performed.

The implicit indication may be that the system information or dedicated signaling received by the UE carries a related parameter for access control in the connected state, for example, an access category that requires access control in the connected state, or a value of an access barring timer in the access control, etc. When the UE receives such information, it is determined that the access control in the connected state is required.

And optionally, when the system information or dedicated signaling received by the UE does not carry a related parameter for access control in the connected state, or the set indication information indicates that access control in the connected state is not required (for example, an indication position is 1), the UE may consider that the result of the access control executed in the connected state is allowed.

Embodiment 3

A UE executes access control in a connected state. According to a result of the control, a corresponding access barring timer may be started. In one or a plurality of the following cases, the UE may stop the access barring timer that is running:

when the UE determines (declares) that a radio link failure has occurred, if one or a plurality of access barring timers are running, then the one or plurality of access barring timers are stopped;

when the UE initializes RRC connection re-establishment, in other words, when the UE initializes re-establishment of the RRC connection, if one or a plurality of access barring timers are running, then the one or plurality of access barring timers are stopped;

when the UE receives an RRC connection reconfiguration message, and the message includes at least, for example, information of a target primary cell, this information being used for instructing the UE to synchronize to the new target cell, and if one or a plurality of access barring timers are running, then the one or plurality of access barring timers are stopped; and when the UE receives an RRC connection release (ConnectionRelease) message, if one or a plurality of access barring timers are running, then the one or plurality of access barring timers are stopped, and after a preset duration, an operation related to connection release is executed, for example, executing an operation of leaving the connected state, resetting a MAC layer, or stopping the running timer, etc.

And optionally, after the UE stops the access barring timer that is running, the UE indicates, to the upper layer, the barring alleviation of the access category corresponding to the access barring timer.

In Embodiments 1-3, the UE starts the access barring timer based on the result of the access control. In addition, the network side may start or stop the access barring timer in the connected state through a signaling indication.

Embodiment 4

When indication information received by a UE carries an indication of starting (or activating) an access barring timer in a connected state, the UE may start the access barring timer. The indication information may be included in a paging message, or system information, or dedicated signaling.

The access barring timer here may be one or a plurality of access barring timers corresponding to one or a plurality of access categories. For example, T5 (a fifth timer) corresponds to an access category 1, and T6 (a sixth timer) corresponds to an access category 2; when receiving the above indication, the UE may start T5 and T6.

The above access barring timer may also be a general access barring timer T7 (a seventh timer). The general access barring timer here may be understood as that the timer is applicable to all access categories that require access control in the connected state. When the timer is running, the result of the access control performed by the UE in the connected state is always barring, or the access of the UE in the connected state is barred. For example, when the UE performs the access control in the connected state, if T7 is running, then the UE considers the result of the access control as barring.

In addition, the starting of the above access barring timer may be periodic. For example, the UE may calculate a reference time point t according to/based on an identity of the UE, such as a C-RNTI or an IMSI, and the access barring timer may be started at time t, t+T, t+2T, t+3T, t+4T . . . according to a period length T configured by the network side and received by the UE.

The time length of the access barring timer started in the above method may be set based on a duration of an average access barring timer. For example, a random number is generated, and the random number is multiplied by the average access barring timer to obtain a duration; the duration may also be determined according to a configuration of the access barring timer carried in the indication information received by the UE.

Embodiment 5

When indication information received by a UE carries an indication of stopping an access barring timer in a connected state, the UE may stop the access barring timer that is running.

The indication information is, for example, a paging message, or system information, or dedicated signaling.

The stopped access barring timer here may be the access barring timers T5 and T6 described in Embodiment 4, and may also be T7 described in Embodiment 4. Once T7 is stopped (not running), when the UE performs access control in the connected state, operations are performed based on an access control parameter in the connected state.

Embodiment 6

The difference between this embodiment and Embodiments 4 and 5 lies in that when receiving a start/stop indication, a UE determines the timing to start or stop an access barring timer.

One implementation method is that the UE immediately starts or stops the access barring timer upon receiving the start/stop indication. For example, the UE immediately starts/stops T5 and T6 or T7 at the time of receiving the above indication.

Another implementation method is that when receiving the start/stop indication, the UE may start or stop the access barring timer at a predefined time.

The predefined time may be the next update time of the system information or the next modification period of the system information; the predefined time may also be a time calculated based on a preset value; alternatively, the UE calculates a reference time point according to/based on an identity of the UE, such as a C-RNTI or an IMSI, and then starts/stops the access barring timer based on this reference time point. The reference time point may be an absolute time point, such as a specific system frame number. The reference time point may also be a relative time point, such as a time offset, and the unit may be milliseconds or slots or subframes; then, the UE calculates the absolute time based on this time offset, and starts/stops the access barring timer at the absolute time point. If a plurality of access barring timers need to be started/stopped, for example, an start/stop time is determined for each of T5 and T6 separately, then the UE may determine the start/stop time of the access barring timers corresponding to different access categories via random selection or according to a specific pattern, for example, based on an access category identity or the identity of the UE, within a period of time after receiving the above indication.

The correspondence between the access barring timer and the access category may be fixed. For example, the access category 1 always corresponds to the timer T1, and the access category 2 always corresponds to the timer T2. Currently, as many as 64 access categories can be defined, so correspondingly, 64 fixed timers are required. However, in practice, the number of access categories of the UE is not large, and therefore, a method may be designed to reduce the number of access timers.

The method in Embodiment 7 may be used to solve the above problem.

Embodiment 7

An access barring timer group is provided on a UE side, and the timer group includes at least two timers, so that the correspondence between the timers in the access barring timer group and access categories is dynamic. In addition, a network side may also predefine the number of access barring timers in the timer group, or indicate, in indication information included in system information/dedicated signaling and the like, to the UE the number of the access barring timers in the access barring timer group. After receiving the indication information, the UE configures the access barring timer group according to the number indication.

The correspondence between the timers in the access barring timer group and the access categories may be one-to-one correspondence. For example, an access category 1 corresponds to a timer 1, and an access category 2 corresponds to a timer 2. Therefore, another implementation manner for the indication of the number of the above access barring timers is that the network side indicates the access categories that require access control. Preferably, when the network side indicates the access categories that require access control, the access categories may be classified into access categories that require access barring timers and access categories that do not require access barring timers. Then, regarding the access categories that require access control and access barring timers as indicated by the network side, the UE configures corresponding access barring timers for these access categories, thereby determining the number of the access barring timers. A specific implementation manner may be that for the access category 1 provided by a non-access stratum, the UE determines, according to the indication received from the network side, whether it is required to perform access control. If it is required to perform access control, then the UE may further determine whether it is required to configure the access barring timer. A determining method may be that the UE determines whether the access category is configured to have a parameter such as a corresponding random factor or an average access barring duration. If so, then it may be determined that the access barring timer needs to be configured; and if not, then it may be determined that the access barring timer does not need to be configured.

The correspondence between the timers in the access barring timer group and the access categories may also be dynamic correspondence. For example, when the access category 1 requires access control, and a result of the access control is barring, the UE may select, from the access barring timer group, a timer that is not running and start the timer, such as T1, and then T1 corresponds to the access category 1. When T1 is stopped or expires, the UE notifies the upper layer of the barring alleviation of the access category 1.

If the access category 2 requires access control and a result of the access control is barring, and if T1 is not running, then the UE may select T1 as an access barring timer for the access category 2 and start the timer, and then T1 corresponds to the access category 2 in this case.

The correspondence between the access barring timer and the access category mentioned above may refer to that during the running of the access barring timer, the access category is barred from accessing or barred from establishing a new PDU session; it may also refer to the access barring timer started because this access category is barred in the access control, or that when the access barring timer is stopped, the barring of this access category is alleviated.

The network side broadcasts parameters or information related to access control via a system message. When these parameters or information is updated, the network side may use, for example, a paging message to notify the UE that the system information (carrying these parameters or information) is updated. When receiving an update indication of the system information, the UE will receive the updated system information in the next modification period of the system information.

However, for certain specific access categories, such as access categories related to emergency calls or M2M services, if their relevant parameters or information related to access control is updated, then the UE needs to know the update immediately, so that the network side needs to indicate in the paging message that parameters of the access control related to the specific access categories are updated, or indicate that the system information carrying the parameters of the access control related to the specific access categories is updated. Then, when receiving the indication, the UE may directly acquire or receive the system information carrying the parameters of the access control related to the specific access categories, so that it is not required to wait for a certain specific time, such as the next modification period of the system information described above.

The access stratum of the UE does not know the service associated with a certain access category. Accordingly, even if the above second situation occurs, because the access stratum does not know that the service corresponding to the access category needs to be acquired in time, it cannot be distinguished when to acquire the updated information.

The following method may be used to solve the above problem.

Embodiment 8

A network side broadcasts or pre-configures, via system information, the correspondence between an acquisition manner and an access category. The correspondence between the acquisition manner and the access category here refers to the acquisition manner adopted by a UE for acquiring updated information when access control information related to the access category is changed or updated. A specific implementation manner may be:

the network side broadcasts or pre-configures (or pre-defines) via the system information that when access control information related to a first access category is updated, a first acquisition manner is adopted; and the network side may also broadcast or pre-configure (or predefines) via the system information that when access control information related to a second access category is updated, a second acquisition manner is adopted. Alternatively, the network side broadcasts or pre-configures (or pre-defines) via the system information that when the access control information related to the first access category is updated, the first acquisition manner is adopted; and for another access category such as the second access category, if the access control information related to the second access category is updated, then the second acquisition manner is adopted. Alternatively, the network side broadcasts or pre-configures (or pre-defines) via the system information that an access category corresponding to adopting the first acquisition manner is referred to as the first access category; and an access category corresponding to not adopting the first acquisition manner is referred to as the second access category, and the second acquisition manner is adopted. Alternatively, the network side groups the access categories. The first access category belonging to the first group adopts the first acquisition manner; and the second access category belonging to the second group adopts the second acquisition manner. The network side broadcasts grouping information of the access categories via the system information. The network side may broadcast only the information of the first group, and the access categories not included in the first group may implicitly correspond to adopting the second acquisition manner.

The UE receives the system information carrying the correspondence between the acquisition manner and the access category, or uses pre-configured information, so as to acquire the correspondence between the acquisition manner and the access category.

When the access control information related to the first access category is updated, the network side may notify the UE via a paging message that the access control information related to the first access category is updated, or that the system information carrying the access control information related to the access category is updated. When the UE receives the above paging message, if the UE supports the first access category, then the UE adopts the first acquisition manner to acquire the system information carrying the access control information related to the first access category.

When the access control information related to the second access category is updated, the network side informs the UE via the paging message that the access control information related to the second access category is updated or the system information carrying the access control information related to the second access category is updated. When the UE receives the above paging message, if the UE supports the second access category, then the UE adopts the second acquisition manner to acquire the system information carrying the access control information related to the second access category.

The difference between the first acquisition manner and the second acquisition manner may be the difference in acquisition time. For example, the first acquisition manner may be that the UE starts acquiring/receiving the system information upon reception of the indication information that is about an update of the system information and carried in the paging message (or direct information); the second acquisition manner may be that the UE acquires/receives the updated system information from the beginning of the next modification period of the system information upon reception of the indication information that is about an update of the system information and carried in the paging message.

In addition, the difference between the first acquisition manner and the second acquisition manner may also be the difference in application time. For example, the first acquisition manner may be that after acquiring the information, the UE performs reconfiguration or access control according to the updated information; and the second acquisition manner may be that after acquiring the information, the UE performs reconfiguration or access control according to the updated information from the beginning of the next modification period of the system information.

Figure 3:
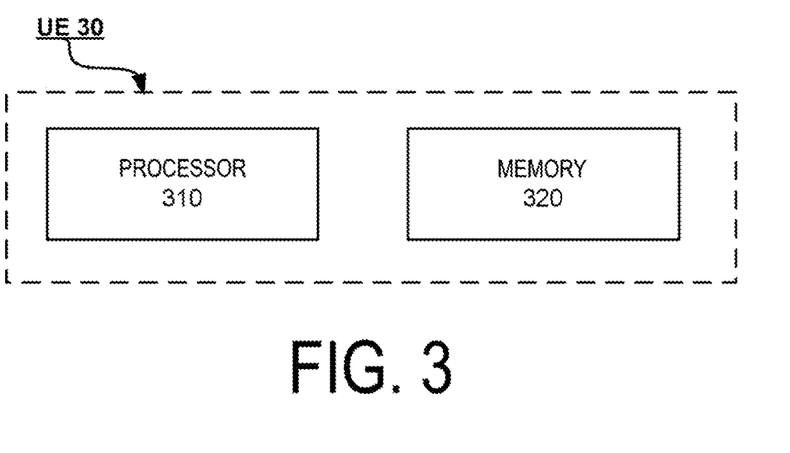
FIG. 3 is a block diagram of a UE according to an embodiment of the present invention.

FIG. 3 is a block diagram of a UE 30 according to an embodiment of the present invention. As shown in FIG. 3, the UE 30 includes a processor 310 and a memory 320. The processor 310 may include, for example, a microprocessor, a microcontroller, an embedded processor, and the like. The memory 320 may include, for example, a volatile memory (such as a random access memory (RAM)), a hard disk drive (HDD), a non-volatile memory (such as a flash memory), or another memory. The memory 320 stores program instructions. When run by the processor 310, the instructions may execute the above access control method executed by the UE described in detail in the present invention.

The program running in the device according to the present invention may be a program that enables a computer to implement the functions of the embodiments of the present invention by controlling a central processing unit (CPU). The program or information processed by the program may be temporarily stored in a volatile memory (such as a random access memory (RAM)), a hard disk drive (HDD), a non-volatile memory (such as a flash memory), or another memory system.

Programs for fulfilling the functions of the various embodiments of the present invention may be recorded in a computer-readable recording medium. Corresponding functions may be fulfilled by causing a computer system to read the programs recorded in the recording medium and execute these programs. The so-called "computer system" here may be a computer system embedded in the device, and may include an operating system or hardware (such as peripheral devices). The "computer-readable recording medium" may be a semiconductor recording medium, an optical recording medium, a magnetic recording medium, a recording medium storing a program dynamically for a short time, or any other recording medium readable by a computer.

Various features or functional modules of the devices used in the above embodiments may be implemented or executed by circuits (for example, single-chip or multi-chip integrated circuits). Circuits designed to execute the functions described in this specification may include a general-purpose processor, a digital signal processor (DSP), an application-specific integrated circuit (ASIC), a field programmable gate array (FPGA), or another programmable logic device, a discrete gate or transistor logic, a discrete hardware component, or any combination of the above devices. The general-purpose processor may be a microprocessor, or any existing processor, controller, microcontroller, or state machine. The above circuit may be a digital circuit or an analog circuit. In the case of new integrated circuit technologies that replace existing integrated circuits because of advancements in the semiconductor technologies, one or a plurality of embodiments of the present invention may also be implemented using these new integrated circuit technologies.

In addition, the present invention is not limited to the above embodiments. Various examples of the embodiments have been described; however, the present invention is not limited thereto. Fixed or non-mobile electronic devices mounted indoors or outdoors may be used as terminal devices or communication devices, such as AV devices, kitchen devices, cleaning devices, air conditioners, office devices, vending machines, and other household appliances.

As described above, the embodiments of the present invention have been described in detail with reference to the accompanying drawings. However, the specific structure is not limited to the above embodiments, and the present invention also includes any design changes that do not deviate from the gist of the present invention. In addition, various modifications may be made to the present invention within the scope of the claims, and embodiments obtained by appropriately combining the technical means disclosed in different embodiments are also included in the technical scope of the present invention. In addition, the components having the same effects described in the above embodiments may be substituted for each other.

What is claimed is:

1. An access control method for a user equipment (UE), the access control method comprising:
   executing an access control check for an access category;
   starting an access control timer when a result of the access control check is access barring; and
   stopping the access control timer that is running when the UE receives a Radio Resource Control (RRC) reconfiguration message or an RRC release message.

2. The access control method according to claim 1, further comprising:
   stopping the access control timer that is running when the UE initializes an RRC connection re-establishment procedure.

3. The access control method according to claim 1, wherein the RRC reconfiguration message includes information for synchronizing to a cell.

4. The access control method according to claim 1, further comprising:
   when the access control timer stops running, notifying an upper layer that access barring for the access category is alleviated.

5. A user equipment comprising a processor, the processor configured to:
   execute an access control check for an access category;
   start an access control timer when a result of the access control check is access barring; and
   stop the access control timer that is running when the UE receives a Radio Resource Control (RRC) reconfiguration message or an RRC release message.

6. The user equipment according to claim 5, wherein the processor is further configured to stop the access control timer that is running when an RRC connection re-establishment procedure is initialized.

7. The user equipment according to claim 5, wherein the RRC reconfiguration message comprises information for synchronizing to a cell.

8. The user equipment according to claim 5, wherein, when the access control timer stops running, the processor is further configured to notify an upper layer that access barring for the access category is alleviated.

9. The access control method according to claim 2, further comprising:
  when the access control timer stops running and after the UE initializes the RRC connection re-establishment procedure, notifying an upper layer that access barring for the access category is alleviated.

10. The access control method according to claim 3, further comprising:
  when the access control timer stops running and the RRC reconfiguration message includes the information for synchronizing to the cell, notifying an upper layer that access barring for the access category is alleviated.

11. The user equipment according to claim 6, wherein when the access control timer stops running and after the RRC connection re-establishment procedure is initialized, the processor is further configured to notify an upper layer that access barring for the access category is alleviated.

12. The user equipment according to claim 7, wherein when the access control timer stops running and the RRC reconfiguration message comprises the information for synchronizing to the cell, the processor is further configured to notify an upper layer that access barring for the access category is alleviated.

* * * * *